(12) United States Patent
Gardner (10) Patent No.: US 8,738,577 B1
(45) Date of Patent: May 27, 2014

(54) CHANGE TRACKING FOR MULTIPHASE DEDUPLICATION

(71) Applicant: Storagecraft Technology Corporation, Draper, UT (US)

(72) Inventor: Andrew Lynn Gardner, Salt Lake City, UT (US)

(73) Assignee: Storagecraft Technology Corporation, Draper, UT (US)

( * ) Notice: Subject to any disclaimer, the term of this patent is extended or adjusted under 35 U.S.C. 154(b) by 0 days.

(21) Appl. No.: 13/782,807

(22) Filed: Mar. 1, 2013

(51) Int. Cl.
*G06F 17/30* (2006.01)

(52) U.S. Cl.
CPC ............................. *G06F 17/30156* (2013.01)
USPC ........................................................ 707/640

(58) Field of Classification Search
CPC ................. G06F 17/30156; G06F 17/30088; G06F 17/30581
USPC .................. 707/674–686, 639–654
See application file for complete search history.

(56) References Cited

U.S. PATENT DOCUMENTS

| | | | |
|---|---|---|---|
| 4,853,843 A | 8/1989 | Ecklund | |
| 5,623,608 A | 4/1997 | Ng | |
| 5,765,173 A | 6/1998 | Cane et al. | |
| 5,778,430 A | 7/1998 | Ish et al. | |
| 5,991,858 A | 11/1999 | Weinlander | |
| 6,148,412 A | 11/2000 | Cannon et al. | |
| 6,760,840 B1 | 7/2004 | Shimbo et al. | |
| 6,912,629 B1 | 6/2005 | West et al. | |
| 7,330,997 B1 | 2/2008 | Odom | |
| 7,337,286 B1 | 2/2008 | West et al. | |
| 7,447,854 B1 * | 11/2008 | Cannon ........................ | 711/162 |
| 7,529,785 B1 | 5/2009 | Spertus et al. | |
| 7,653,668 B1 | 1/2010 | Shelat et al. | |
| 7,783,600 B1 | 8/2010 | Spertus et al. | |
| 7,873,601 B1 | 1/2011 | Kushwah | |
| 7,925,623 B2 | 4/2011 | Therrien et al. | |
| 7,962,452 B2 | 6/2011 | Anglin | |
| 8,037,032 B2 | 10/2011 | Pershin et al. | |
| 8,041,677 B2 | 10/2011 | Sumner et al. | |
| 8,055,613 B1 | 11/2011 | Mu et al. | |
| 8,086,569 B2 | 12/2011 | Jasrasaria | |
| 8,099,572 B1 | 1/2012 | Arora et al. | |
| 8,117,410 B2 | 2/2012 | Lu et al. | |
| 8,131,924 B1 | 3/2012 | Frandzel et al. | |
| 8,190,836 B1 | 5/2012 | Zheng et al. | |
| 8,281,099 B2 | 10/2012 | Kishi | |
| 8,285,681 B2 | 10/2012 | Prahlad et al. | |
| 8,335,770 B2 | 12/2012 | Merchant et al. | |

(Continued)

OTHER PUBLICATIONS

U.S. Appl. No. 13/782,986, filed Mar. 1, 2013 titled "Defragmentation During Multiphase Deduplication".

(Continued)

*Primary Examiner* — Thu-Nguyet Le
(74) *Attorney, Agent, or Firm* — Maschoff Brennan (57) ABSTRACT

Change tracking for multiphase deduplication. In one example embodiment, a method of tracking changes to a source storage for multiphase deduplication includes a change tracking phase. The change tracking phase includes performing a hash function on each allocated block in a source storage that is changed between a prior point in time and a subsequent point in time, and tracking, in a change log, the location in the source storage of each changed block and the corresponding hash value. The hash function calculates a hash value corresponding to the changed block.

8 Claims, 7 Drawing Sheets

(56) References Cited

U.S. PATENT DOCUMENTS

| | | | |
|---|---|---|---|
| 8,364,641 | B2 | 1/2013 | Hirsch |
| 8,380,678 | B2 | 2/2013 | Manson |
| 8,407,186 | B1 | 3/2013 | Cremelie et al. |
| 8,682,870 | B1 | 3/2014 | Gardner |
| 2002/0073276 | A1* | 6/2002 | Howard et al. ............ 711/113 |
| 2003/0105810 | A1 | 6/2003 | McCrory et al. |
| 2003/0204609 | A1 | 10/2003 | Anderson et al. |
| 2004/0267836 | A1 | 12/2004 | Armangau et al. |
| 2005/0216665 | A1 | 9/2005 | Takakuwa |
| 2005/0240813 | A1 | 10/2005 | Okada et al. |
| 2006/0064416 | A1 | 3/2006 | Sim-Tang |
| 2006/0173935 | A1 | 8/2006 | Merchant et al. |
| 2007/0100913 | A1 | 5/2007 | Sumner et al. |
| 2007/0136200 | A1 | 6/2007 | Frank et al. |
| 2008/0005141 | A1 | 1/2008 | Zheng et al. |
| 2008/0184001 | A1 | 7/2008 | Stager |
| 2008/0208933 | A1 | 8/2008 | Lyon |
| 2008/0235306 | A1 | 9/2008 | Kim et al. |
| 2008/0244204 | A1 | 10/2008 | Cremlie et al. |
| 2008/0307347 | A1 | 12/2008 | Cisler et al. |
| 2009/0164529 | A1 | 6/2009 | McCain |
| 2009/0204649 | A1 | 8/2009 | Wong et al. |
| 2009/0204765 | A1 | 8/2009 | Gupta et al. |
| 2009/0254507 | A1 | 10/2009 | Hosoya et al. |
| 2010/0076934 | A1* | 3/2010 | Pershin et al. ............ 707/640 |
| 2010/0191748 | A1 | 7/2010 | Martin et al. |
| 2010/0257142 | A1 | 10/2010 | Murphy et al. |
| 2010/0260187 | A1 | 10/2010 | Ongole et al. |
| 2011/0010498 | A1 | 1/2011 | Lay et al. |
| 2011/0016083 | A1 | 1/2011 | Patterson |
| 2011/0173605 | A1 | 7/2011 | Bourne |
| 2011/0218969 | A1 | 9/2011 | Anglin et al. |
| 2011/0238775 | A1 | 9/2011 | Wu et al. |
| 2011/0276737 | A1 | 11/2011 | Mei et al. |
| 2012/0079221 | A1 | 3/2012 | Sivasubramanian et al. |
| 2012/0109894 | A1 | 5/2012 | Kishi |
| 2012/0136832 | A1 | 5/2012 | Sadhwani |
| 2012/0136834 | A1 | 5/2012 | Zhao |
| 2012/0150949 | A1 | 6/2012 | Vijayan Retnamma et al. |
| 2012/0151177 | A1 | 6/2012 | Kalach et al. |
| 2012/0151586 | A1 | 6/2012 | Hentunen |
| 2012/0158660 | A1 | 6/2012 | Hirsch |
| 2012/0198219 | A1 | 8/2012 | Preiesberger et al. |
| 2012/0246457 | A1 | 9/2012 | Sosnosky et al. |
| 2013/0024424 | A1 | 1/2013 | Prahlad et al. |
| 2013/0042083 | A1 | 2/2013 | Mutalik et al. |
| 2013/0046944 | A1 | 2/2013 | Domyo et al. |
| 2013/0138620 | A1 | 5/2013 | Yakushev et al. |
| 2013/0179407 | A1 | 7/2013 | Stoakes |

OTHER PUBLICATIONS

U.S. Appl. No. 13/782,549, filed Mar. 1, 2013 titled "Multiphase Deduplication".
U.S. Appl. No. 13/782,822, filed Mar. 1, 2013 tiled "Restoring a Backup From a Deduplication Vault Storage".
U.S. Appl. No. 13/782,717, filed Mar. 1, 2013 tiled "Deduplication Vault Storage Seeding".
U.S. Appl. No. 13/782,957, filed Mar. 1, 2013 tiled "Local Seeding of a Restore Storage for Restoring a Backup From a Remote Deduplication Vault Storage".
U.S. Appl. No. 13/782,822, Jun. 5, 2013, Office Action.
U.S. Appl. No. 13/782,549, Jun. 24, 2013, Office Action.
U.S. Appl. No. 13/782,717, Jun. 13, 2013, Office Action.
U.S. Appl. No. 13/782,986, Jun. 10, 2013, Office Action.
U.S. Appl. No. 13/782,957, Jun. 20, 2013, Office Action.
U.S. Appl. No. 13/782,822, Oct. 10, 2013, Office Action.
U.S. Appl. No. 13/782,549, Oct. 7, 2013, Office Action.
U.S. Appl. No. 13/782,717, Oct. 7, 2013, Office Action.
U.S. Appl. No. 13/782,986, Nov. 1, 2013, Notice of Allowance.
U.S. Appl. No. 13/782,957, Nov. 15, 2013, Office Action.
U.S. Appl. No. 14/166,569, filed Jan. 28, 2014 titled "Virtual Defragmentation in a Deduplication Vault".
U.S. Appl. No. 13/782,822, Feb. 25, 2014, Office Action.
U.S. Appl. No. 13/782,822, Mar. 21, 2014, Notice of Allowance.
U.S. Appl. No. 14/166,569, Mar. 14, 2014, Office Action.

* cited by examiner

```
500(1)  d41d8cd98f00b204e9800998ecf8427e
500(2)  5eeda9a0f4b70d10b01ad221ee37983d
500(3)  ef3c4fa4364e0a12f15c82dfc1efd19f
500(4)  3ef74a91791ee701041da91604205d0b
500(5)  98d1dded8761d5a4fc9281c2e9f2a6ac
500(6)  97f8403714e985554786410a7ae71b09
500(7)  e9f738b402ef2153a57282db58f8f60c
500(8)  4aeacdfe36e0a1c8b5b4e14f6b16e497
500(9)  1b61fc5c0223e758efb8efea88b76e02
           ⋮
500(z)  a98a9b3489132bef6d04bd4131c089a1
```

CHANGE TRACKING FOR MULTIPHASE DEDUPLICATION

FIELD

The embodiments disclosed herein relate to multiphase deduplication performed during the creation of incremental backups of storages, and more particularly, to the tracking of changes to the storages between the creations of individual backups.

BACKGROUND

A storage is computer-readable media capable of storing data in blocks. Storages face a myriad of threats to the data they store and to their smooth and continuous operation. In order to mitigate these threats, a backup of the data in a storage may be created at a particular point in time to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a backup storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the backup storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

One common problem encountered when backing up multiple similar source storages to the same backup storage using image backup is the potential for redundancy within the backed-up data. For example, if multiple source storages utilize the same commercial operating system, such as WINDOWS® XP Professional, they may store a common set of system files which will have identical blocks. If these source storages are backed up to the same backup storage, these identical blocks will be stored in the backup storage multiple times, resulting in redundant blocks. Redundancy in a backup storage may increase the overall size requirements of the backup storage and increase the bandwidth overhead of transporting data to the backup storage.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to multiphase deduplication performed during the creation of incremental backups of storages, and more particularly, to the tracking of changes to the storages between the creations of individual backups. The example methods disclosed herein may be employed to eliminate duplicate data in the incremental backups of source storages stored in a vault storage. The multiple phases of the example methods disclosed herein may also result in decreased fragmentation of the data in the vault storage, resulting in increased efficiency and speed during the restoration of each incremental backup. Further, the change tracking phase of the example methods disclosed herein may reduce the cost and time of the analysis phase of the example methods disclosed herein, resulting in increased efficiency and speed during the creation of each incremental backup.

In one example embodiment, a method of tracking changes to a source storage for multiphase deduplication includes a change tracking phase. The change tracking phase includes performing a hash function on each allocated block in a source storage that is changed between a prior point in time and a subsequent point in time, and tracking, in a change log, the location in the source storage of each changed block and the corresponding hash value. The hash function calculates a hash value corresponding to the changed block.

In another example embodiment, a method of tracking changes to a source storage for multiphase deduplication includes a change tracking phase. The change tracking phase includes performing the following steps for each allocated block in a source storage that is changed between the taking of a prior snapshot at a prior point in time and upon which a prior backup is based and the taking of a subsequent snapshot at a subsequent point in time and upon which a subsequent incremental backup is based: performing a cryptographic hash function on the changed block to calculate a cryptographic hash value corresponding to the changed block, and tracking, in a change log, the location in the source storage of each changed block and the corresponding cryptographic hash value.

In yet another example embodiment, a method of multiphase deduplication includes a change tracking phase, an analysis phase, and a backup phase. The change tracking phase includes performing the following steps for each allocated block in a source storage that changed between the taking of a prior snapshot at a prior point in time and upon which a prior base or incremental backup is based and the taking of a subsequent snapshot at a subsequent point in time and upon which a subsequent incremental backup is based: performing a cryptographic hash function on the changed block to calculate a cryptographic hash value corresponding to the changed block, and tracking, in a change log, the location in the source storage of the changed block and the corresponding cryptographic hash value. The analysis phase is performed after completion of the change tracking phase and includes performing the following steps for each unique hash value stored in the change log: comparing the hash value with hash values of blocks that are stored in a vault storage to determine if the corresponding unique changed block in the source storage is duplicated in the vault storage, and associating a location of the corresponding unique changed block in the source storage with a location of the corresponding duplicated block stored in the vault storage if the corresponding unique changed block is duplicated in the vault storage. The backup phase includes performing, after completion of the analysis phase, the following steps for all unique nonduplicate runs of changed blocks stored in the source storage: reading the runs from the source storage, storing the runs in the vault storage in the same sequence as stored in the source storage at the subsequent point in time, and associating a location of each run stored in the source storage with a corresponding location of the run stored in the vault storage.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein include multiphase deduplication performed during the creation of backups of incremental storages, and more particularly, to the tracking of changes to the storages between the creations of individual backups. The example methods disclosed herein may be employed to eliminate duplicate data in the incremental backups of source storages stored in a vault storage. The multiple phases of the example methods disclosed herein may also result in decreased fragmentation of the data in the vault storage, resulting in increased efficiency and speed during the restoration of each incremental backup. Further, the change tracking phase of the example methods disclosed herein may reduce the cost and time of the analysis phase of the example methods disclosed herein, resulting in increased efficiency and speed during the creation of each incremental backup.

The term "storage" as used herein refers to computer-readable media, or some logical portion thereof such as a volume, capable of storing data in blocks. The term "block" as used herein refers to a fixed-length discrete sequence of bits. The term "changed block" as used herein refers to a block that has changed between two specific points in time, where after the change the block is allocated. Therefore, a block that is changed from an allocated block to an unallocated block (e.g., where a block is deleted) is not referred to herein as a "changed block." The term "run" as used herein refers to one or more blocks stored sequentially on a storage. The term "backup" when used herein as a noun refers to a copy or copies of one or more blocks from a storage.

Figure 1:
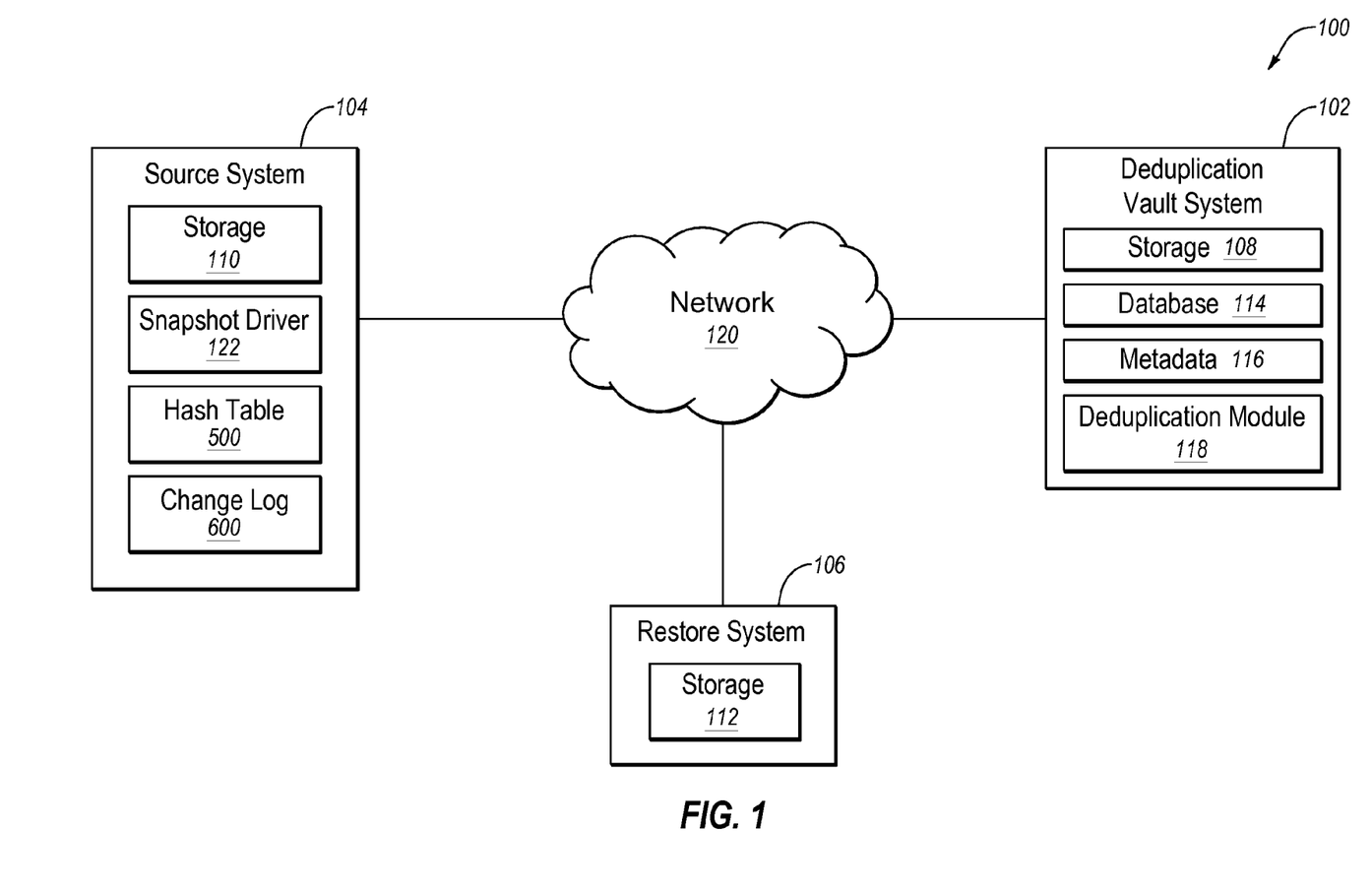
FIG. 1 is a schematic block diagram illustrating an example deduplication backup system.

FIG. 1 is a schematic block diagram illustrating an example deduplication backup system 100. As disclosed in FIG. 1, the example system 100 includes a deduplication vault system 102, a source system 104, and a restore system 106. The systems 102, 104, and 106 include storages 108, 110, and 112, respectively. The deduplication vault system 102 also includes a database 114, metadata 116, and a deduplication module 118. The source system 104 further includes a snapshot driver 122, a hash table 500, and a change log 600. The systems 102, 104, and 106 are able to communicate with one another over a network 120.

Each system 102, 104, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, and flash memory drives. The network 120 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof.

During performance of the example methods disclosed herein, the snapshot driver 122 may track changes in the change log 600, during a change tracking phase, to the blocks stored in the source storage 110 between a prior point in time and a subsequent point in time. The snapshot driver 122 may further perform, during the change tracking phase, a hash function on each changed block to calculate a hash value corresponding to each changed block and store the hash values of the changed blocks in the change log 600 using the hash table 500. Next, the deduplication module 118 may analyze, during a subsequent analysis phase, the hash values in the change log 600 to determine if the corresponding changed blocks are already duplicated in the vault storage 108. Then the deduplication module 118 may back up, during a subsequent backup phase, those changed blocks from the source storage 110 that do not already have duplicate blocks stored in the vault storage 108, thus creating an incremental backup of the source storage 110 at the subsequent point in time. Subsequently, the deduplication module 118 may restore, during a restore phase, each changed block that was stored in the source storage 110 at the subsequent point in time to the restore storage 112, thus restoring the incremental backup. The database 114 and the metadata 116 may be employed to track information related to the source storage 110, the vault storage 108, and the backup of the source storage 110 that is stored in the vault storage 108. For example, the database 114 and the metadata 116 may be identical in structure and function to the database 500 and the metadata 700 disclosed in related U.S. patent application Ser. No. 13/782,549, titled "MULTIPHASE DEDUPLICATION," which was filed on Mar. 1, 2013 and is expressly incorporated herein by reference in its entirety. As discussed in greater detail below, the calculating and storing of hash values during the change tracking phase may reduce the cost and time of the analysis phase, resulting in increased efficiency and speed during the creation of each incremental backup.

In one example embodiment, the deduplication vault system 102 may be a file server, the source system 104 may be a first desktop computer, the restore system 106 may be a second desktop computer, and the network 120 may include the internet. In this example embodiment, the file server may be configured to periodically back up the storage of the first desktop computer over the internet. The file server may then be configured to restore the most recent backup to the storage of the second desktop computer over the internet if the first desktop computer experiences corruption of its storage or if the first desktop computer's storage becomes unavailable.

Although only a single storage is disclosed in each of the systems 102, 104, and 106 in FIG. 1, it is understood that any of the systems 102, 104, or 106 may instead include two or more storages. Further, although the systems 102, 104, and 106 are disclosed in FIG. 1 as communicating over the network 120, it is understood that the systems 102, 104, and 106 may instead communicate directly with each other. For example, in some embodiments any combination of the systems 102, 104, and 106 may be combined into a single system. Also, although the storages 108, 110, and 112 are disclosed as separate storages, it is understood that any combination of the storages 108, 110, and 112 may be combined into a single storage. For example, in some embodiments the storage 110 may function as both a source storage during the creation of a backup and a restore storage during a restore of the backup, which may enable the storage 110 to be restored to a state of an earlier point in time. Further, although the deduplication module 118 is the only module disclosed in the example deduplication backup system 100 of FIG. 1, it is understood that the functionality of the deduplication module 118 may be replaced or augmented by one or more similar modules residing on any of the systems 102, 104, and 106. Finally, although only a single source storage and a single restore storage are disclosed in the example deduplication backup system 100 of FIG. 1, it is understood that the deduplication vault system 102 of FIG. 1 is configured to simultaneously back up or restore multiple source storages. For example, the greater the number of storages that are backed up to the vault storage 108 of the deduplication vault system 102, the greater the likelihood for reducing redundancy and overall size of the data being backed up, resulting in corresponding decreases in the bandwidth overhead of transporting data to the backup storage.

Having described one specific environment with respect to FIG. 1, it is understood that the specific environment of FIG. 1 is only one of countless environments in which the example methods disclosed herein may be employed. The scope of the example embodiments is not intended to be limited to any particular environment.

Figure 2:
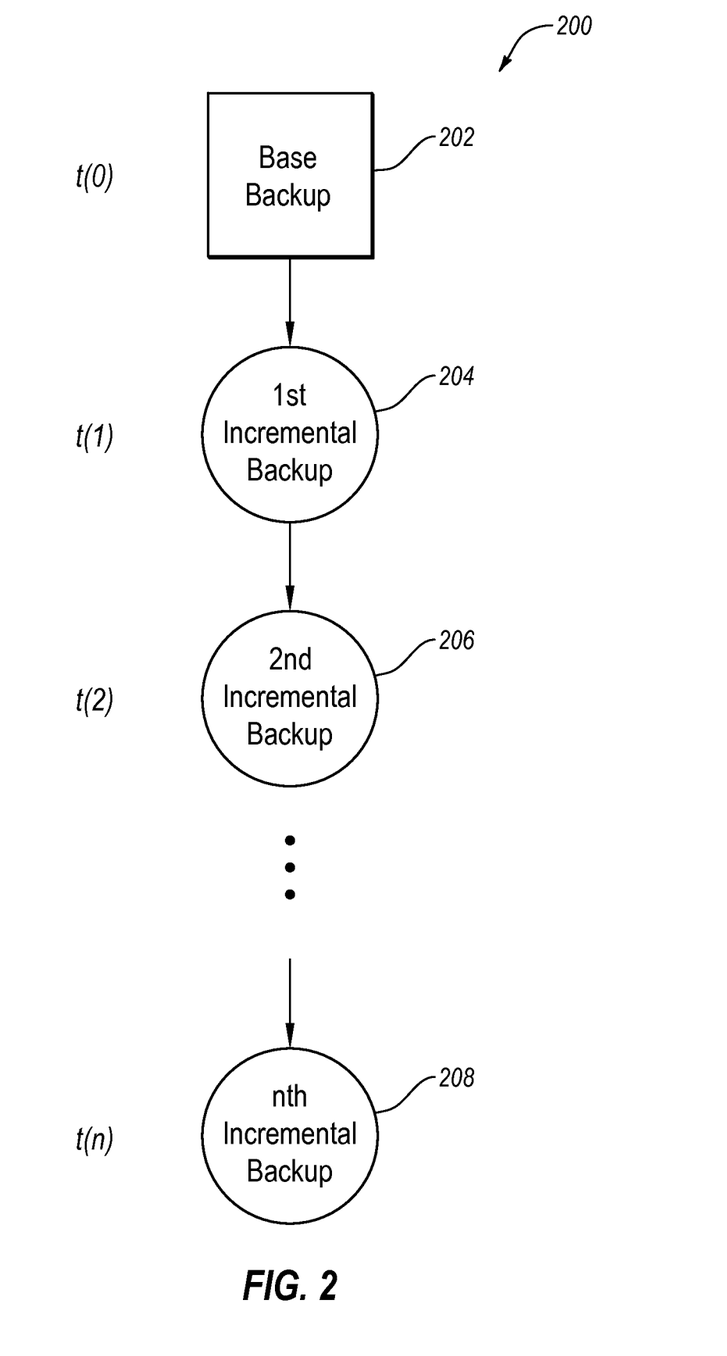
FIG. 2 is a schematic flowchart illustrating an example method for creating a base backup and multiple incremental backups of a source storage.

FIG. 2 is a schematic flowchart illustrating an example method 200 for creating a base backup and multiple incremental backups of a source storage. The method 200 may be implemented, in at least some embodiments, by the snapshot driver 122 and the deduplication module 118 of the deduplication vault system 102 of FIG. 1. For example, the snapshot driver 122 and the deduplication module 118 may be configured to execute computer instructions to perform operations of creating a base backup and multiple incremental backups of the source storage 110, as represented by one or more of steps 202-208 of the method 200. Although illustrated as discrete steps, various steps may be divided into additional steps, combined into fewer steps, or eliminated, depending on the desired implementation. The method 200 will now be discussed with reference to FIGS. 1 and 2.

The method 200 may begin at step 202, in which a base backup is created to capture the state at time t(0). For example, the deduplication module 118 may create a base backup of all allocated blocks of the source storage 110 as allocated at time t(0) and store the allocated blocks in the vault storage 108. The state of the source storage 110 at time t(0) may be captured using snapshot technology in order to capture the data stored in the source storage 110 at time t(0) without interrupting other processes, thus avoiding downtime of the source storage 110. The base backup may be very large depending on the size of the source storage 110 and the number of allocated blocks at time t(0). As a result, the base backup may take a relatively long time to create and consume a relatively large amount of space in the vault storage 108.

At steps 204 and 206, 1st and 2nd incremental backups are created to capture the states at times t(1) and t(2), respectively. For example, the snapshot driver 122 and the deduplication module 118 may create a 1st incremental backup of only changed blocks of the source storage 110 present at time t(1) and store the changed blocks in the vault storage 108, then later create a 2nd incremental backup of only changed blocks of the source storage 110 present at time t(2) and store the changed blocks in the vault storage 108. The states of the source storage 110 at times t(1) and t(2) may again be captured using snapshot technology, thus avoiding downtime of the source storage 110. Each incremental backup includes only those allocated blocks from the source storage 110 that were changed after the time of the previous backup. Thus, the 1st incremental backup includes only those allocated blocks from the source storage 110 that changed between time t(0) and time t(1), and the 2nd incremental backup includes only those allocated blocks from the source storage 110 that changed between time t(1) and time t(2). In general, as compared to the base backup, each incremental backup may take a relatively short time to create and consume a relatively small storage space in the vault storage 108.

At step 208, an nth incremental backup is created to capture the state at time t(n). For example, the snapshot driver 122 and the deduplication module 118 may create an nth incremental backup of only changed blocks of the source storage 110 present at time t(n), using snapshot technology, and store the changed blocks in the vault storage 108. The nth incremental backup includes only those allocated blocks from the source storage 110 that changed between time t(n) and time t(n−1).

As illustrated in the example method 200, incremental backups may be created on an ongoing basis. The frequency of creating new incremental backups may be altered as desired in order to adjust the amount of data that will be lost should the source storage 110 experience corruption of its stored data or become unavailable at any given point in time. The data from the source storage 110 can be restored to the state at the point in time of a particular incremental backup by applying the backups from oldest to newest, namely, first applying the base backup and then applying each successive incremental backup up to the particular incremental backup.

Although only allocated blocks are backed up in the example method 200, it is understood that in alternative implementations both allocated and unallocated blocks may be backed up during the creation of a base backup or an incremental backup. This is typically done for forensic purposes, because the contents of unallocated blocks can be interesting where the unallocated blocks contain data from a previous point in time when the blocks were in use and allocated. Therefore, the creation of base backups and incremental backups as disclosed herein is not limited to allocated blocks but may also include unallocated blocks.

Further, although only a base backup and incremental backups are created in the example method 200, it is understood that the source storage 110 may instead be backed up by creating a base backups and decremental backups. Decremental backups are created by initialing creating a base backup to capture the state at a previous point in time, then updating the base backup to capture the state at a subsequent point in time by modifying only those blocks in the base backup that changed between the previous and subsequent points in time. Prior to the updating of the base backup, however, the original blocks in the base backup that correspond to the changed blocks are copied to a decremental backup, thus enabling restoration of the source storage 110 at the previous point in time (by restoring the updated base backup and then restoring the decremental backup) or at the subsequent point in time (by simply restoring the updated base backup). Since restoring a single base backup is generally faster than restoring a base backup and one or more incremental or decremental backups, creating decremental backups instead of incremental backups may enable the most recent backup to be restored more quickly since the most recent backup is always a base backup or an updated base backup instead of potentially being an incremental backup. Therefore, the creation of backups as disclosed herein is not limited to a base backup and incremental backups but may also include a base backup and decremental backups.

Figure 3A:
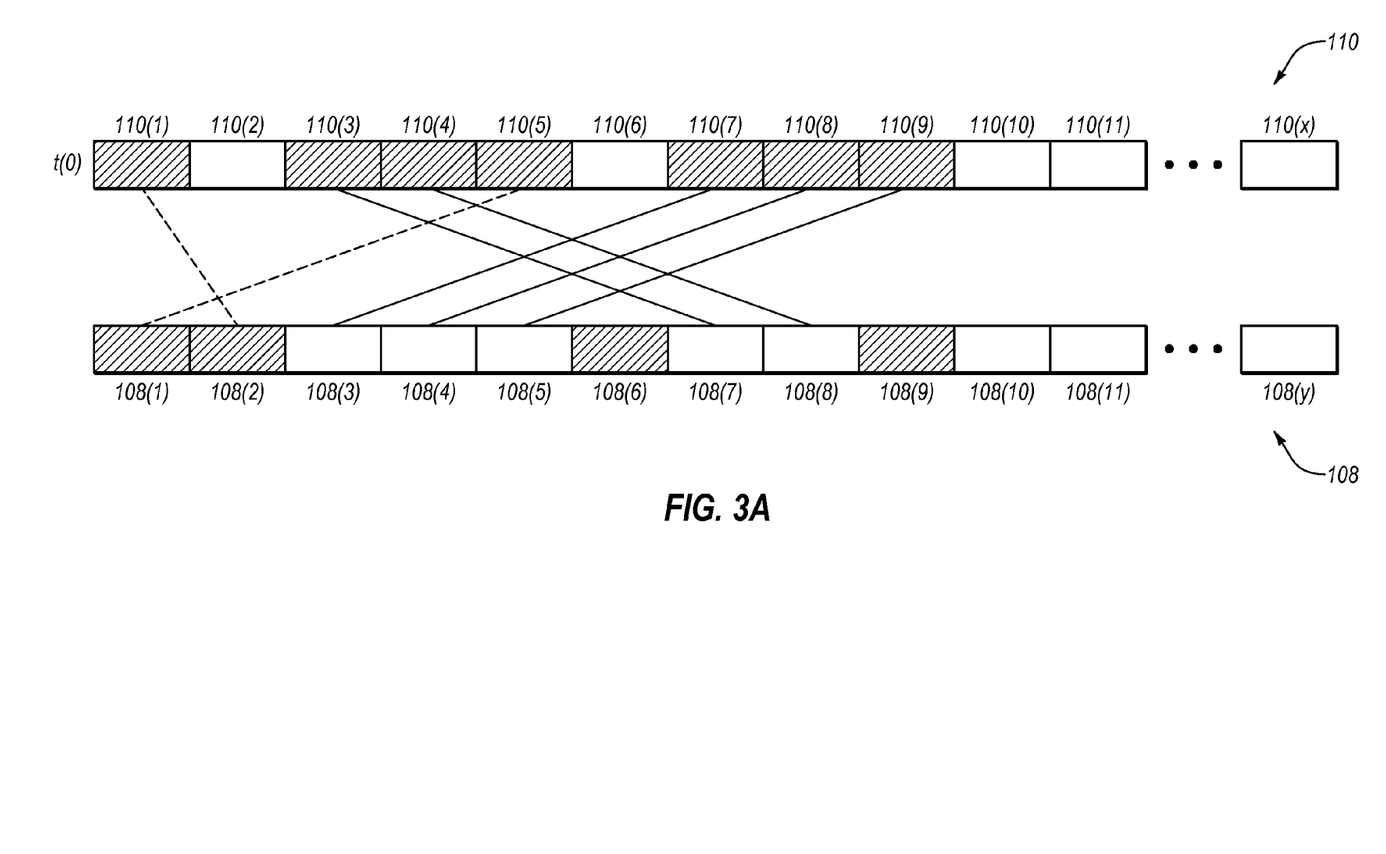
FIG. 3A is a schematic flowchart illustrating the creation of an example base backup.
Figure 3B:
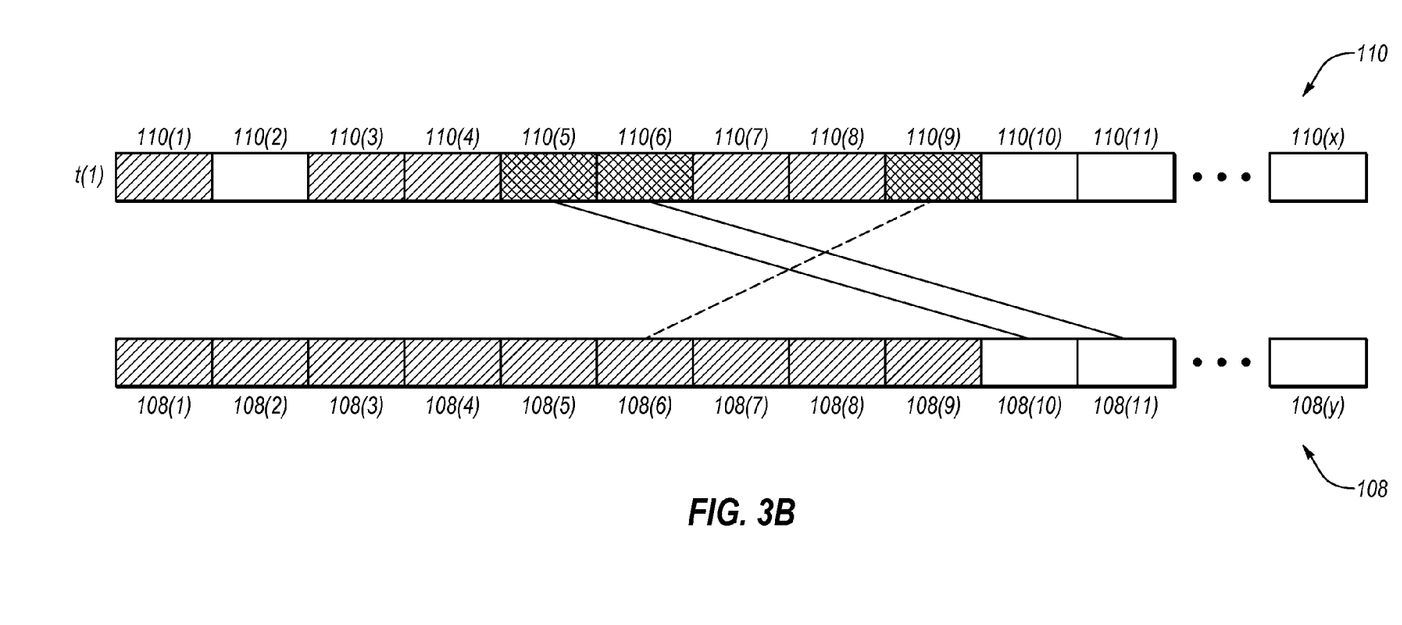
FIG. 3B is a schematic flowchart illustrating the creation of an example incremental backup.

FIG. 3A is a schematic flowchart illustrating the creation of an example base backup and FIG. 3B is a schematic flowchart illustrating the creation of an example incremental backup. The creation of the base backup in FIG. 3A and the creation of the incremental backup in FIG. 3B may be performed, in at least some embodiments, by the snapshot driver 122 of the source system 104 and the deduplication module 118 of the deduplication vault system 102 of FIG. 1. For example, the deduplication module 118 may be configured to execute computer instructions to perform operations of creating a base backup of the source storage 110 and the snapshot driver 122 and the deduplication module 118 may be configured to execute computer instructions to perform operations of creating an incremental backup of the source storage 110.

As disclosed in FIGS. 3A and 3B, the source storage 110 is partitioned into a physical layout of blocks 110(1)-110(x), where x is the number of total blocks in the source storage 110. Similarly, the vault storage 108 is partitioned into a physical layout of blocks 108(1)-108(y), where y is the number of total blocks in the vault storage 108. In some example embodiments, the size of each block is 4096 bytes, although any other block size could instead be employed. The size of each block may be configured to match the standard sector size of a file system of the vault storage 108 and the source storage 110. In some example embodiments, y may be greater than x in order to allow multiple storages to be backed up in the vault storage 108. The hatched blocks in FIGS. 3A and 3B illustrate allocated blocks in the source storage 110, the cross-hatched blocks in FIG. 3B illustrate changed blocks in the source storage 110 that changed between time t(0) and time t(1), and the blank blocks in FIGS. 3A and 3B illustrate unallocated blocks. The dashed lines in FIGS. 3A and 3B represent a determination that an allocated block from the source storage 110 is already duplicated in the vault storage 108. The solid lines in FIGS. 3A and 3B represent a determination that an allocated block from the source storage 110 is not duplicated in the vault storage 108.

As disclosed in FIG. 3A, a base backup may be created of the source storage 110 to capture the state at time t(0). During an analysis phase of the creation of the base backup of the source storage 110, the blocks 110(1) and 110(5) are determined to already be duplicated as blocks 108(2) and 108(1), respectively. Thus, there is no need to again store the blocks 110(1) and 110(5) in the vault storage 108. Conversely, the run 110(3)-110(4) and the run 110(7)-110(9) are determined during the analysis phase to be nonduplicate blocks. Therefore, during a backup phase of the creation of the base backup of the source storage 110, the run 110(3)-110(4) and the run 110(7)-110(9) are stored in the run 108(7)-108(8) and the run 108(3)-108(5), respectively, of the vault storage 108.

It is noted that the performance of the analysis phase prior to the performance of the backup phase may enable information about the source storage 110 to be gathered that can be used to decrease the fragmentation of the data in the vault storage 108. In particular, it may be determined during the analysis phase that runs exist in the nonduplicate blocks in the source storage 110. Identifying runs in the nonduplicate blocks prior to backing up the nonduplicate blocks may enable the identification of matching runs of unallocated blocks in the vault storage 108 so that the runs from the source storage 110 can be stored as runs in the vault storage 108 without being divided. This storing of runs in the vault storage 108 may be particularly useful during a subsequent restore phase because it reduces the time spent seeking the blocks that make up the backup of the source storage 110.

For example, if a run from the source storage 110 is stored as a run in a single location in the vault storage 108, restoring that particular run will require only a single seek operation. However, if the run from the source storage 110 is split up and stored in two separate locations in the vault storage 108, restoring that particular run will require two seek operations instead of one, thus potentially doubling the time spent during a restore phase seeking the blocks that make up the run.

This reduction in seek operations can be illustrated in FIG. 3A. As disclosed in FIG. 3A, the performance of the analysis phase before the performance of the backup phase enables the identification of nonduplicate allocated blocks in the run 110(3)-110(4) and the run 110(7)-110(9) of the source storage 110, and a corresponding identification of matching runs of unallocated blocks in the vault storage 108, namely, the run 108(7)-108(8) and the run 108(3)-108(5). However, if the analysis phase were not performed and the nonduplicate allocated blocks from the source storage 110 were simply stored sequentially in the first available unallocated block in the vault storage 108, the run 110(3)-110(4) would be stored in the run 108(3)-108(4), but then the block 110(7) of the run 110(7)-110(9) would be stored in the block 108(5) and the blocks 110(8) and 110(9) of the run 110(7)-110(9) would be stored in the next available unallocated blocks 108(7) and 108(8), thus splitting up the run 110(7)-110(9). The splitting up of the run 110(7)-110(9) in the vault storage 108 would require two seek operations instead of one during a restore of the run 110(7)-110(9), thus potentially doubling the time spent seeking the run 110(7)-110(9) during the restore.

It is understood that the scale of runs with lengths of two blocks and three blocks disclosed in FIG. 3A is for example purposes only, and in practice runs may have lengths of millions or even billions of blocks. With a longer run, the potential exists for the run being split into many different locations in a backup, and the maintenance of the run in a single location in the backup may thus avoid many extra seek operations.

As disclosed in FIG. 3B, an incremental backup may be created of the source storage 110 to capture the state at time t(1). The incremental backup of the source storage 110 will include only those allocated blocks from the source storage 110 that changed between time t(0) and time t(1). In particular, as time progresses after time t(0) but prior to time t(1), changes may occur to specific blocks on the source storage 110. When data within a block is changed, the block is then targeted for the next incremental backup. Thus, during an analysis phase of the creation of the incremental backup of the source storage 110, only the changed blocks 110(5), 110(6), and 110(9) are analyzed. The changed block 110(9) is determined to already be duplicated as block 108(6), and thus there is no need to again store changed block 110(9) in the vault storage 108. Conversely, the changed block 110(5) and the newly allocated, and therefore changed, block 110(6) are determined during the analysis phase to be nonduplicate blocks. Therefore, during a backup phase of the creation of the incremental backup of the source storage 110, the changed blocks of the run 110(5)-110(6) are stored in the run 108(10)-108(11) of the vault storage 108.

It is understood, as discussed in greater detail below, that the vault storage 108 is only configured to store a single copy of each unique block from the source storage 110. For example, if blocks 110(5) and 110(9) were identical in FIG. 3B, only a single unique copy of these two blocks would be stored in block 108(6) of the vault storage 108. Therefore, the vault storage 108 is configured not only to avoid duplication of blocks across backups from separate storages, but also to avoid duplication of blocks within a single storage.

Figure 4:
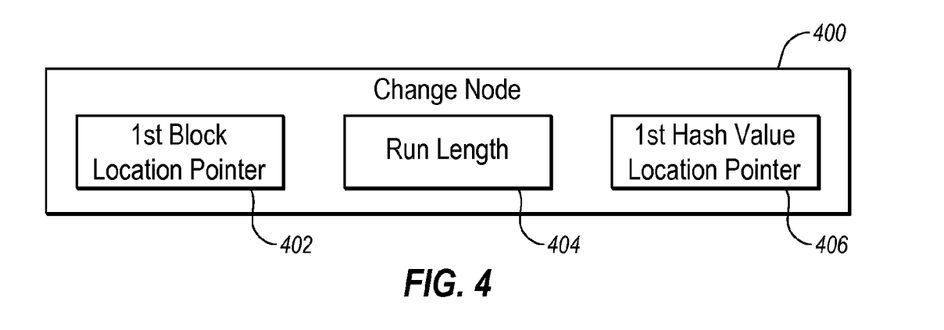
FIG. 4 is a schematic block diagram illustrating an example change node.
Figure 5:
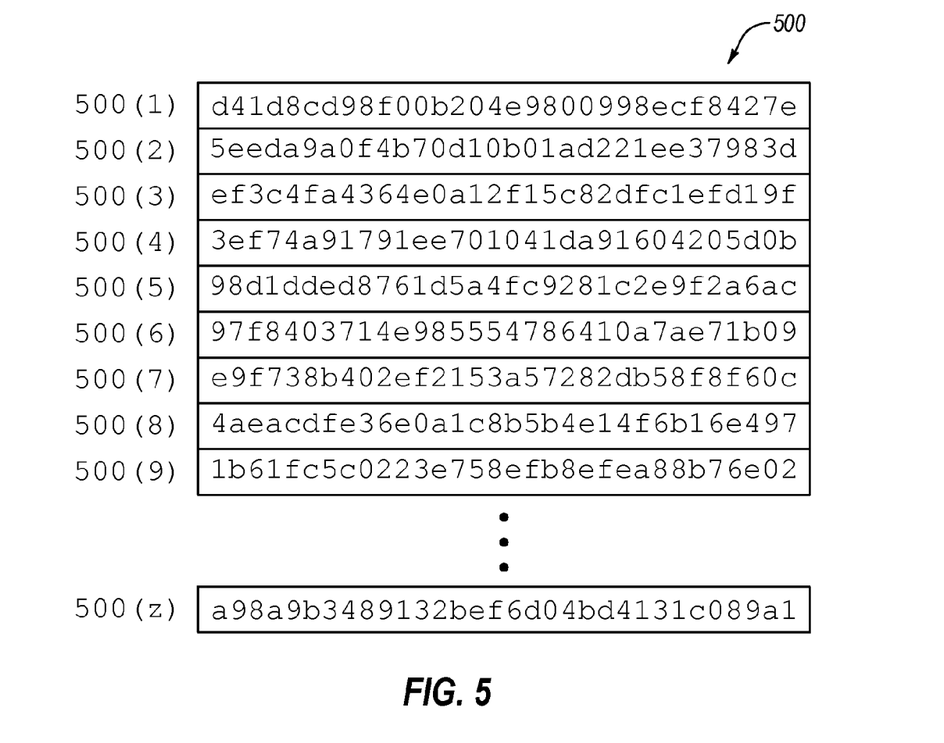
FIG. 5 is a schematic block diagram illustrating an example hash table.
Figure 6:
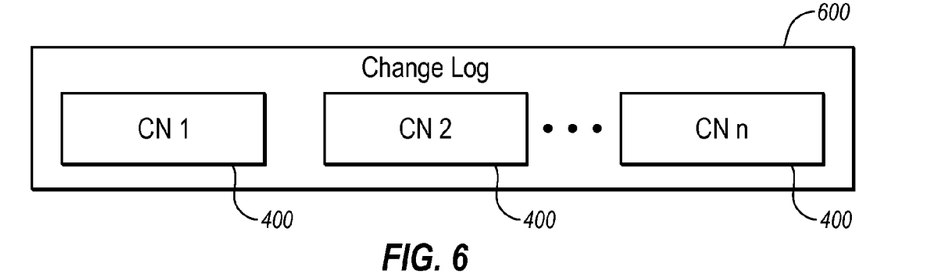
FIG. 6 is a schematic block diagram illustrating an example change log configured to track changes made to a source storage between the creation of individual backups.

FIG. 4 is a schematic block diagram illustrating an example change node 400. FIG. 5 is a schematic block diagram illustrating an example hash table 500. FIG. 6 is a schematic block diagram illustrating an example change log 600 configured to track changes made to the source storage 110 of FIG. 1 between the creation of individual backups. It is understood that although the change log 600 is structured as a set of change nodes 400 that each includes 1$^{st}$ hash location pointer field 406 to the hash table 500, the change log 600 could instead have any other data structure, or combination of data structures, configured to track the locations and hash values of changed blocks in the source storage 110 of FIG. 1.

As disclosed in FIG. 4, each example change node 400 includes a 1st block location pointer field 402, a run length field 404, and a 1st hash value location pointer field 406. The 1st block location pointer field 402 points to the location of the first changed block of a run of changed blocks in the source storage 110. The 1st block location pointer value stored in the 1st block location pointer field 402 may be between 38 and 64 bits in length, for example, depending on the total size of the source storage 110 of FIG. 1. The run length field 404 indicates the length of the run that begins at the location pointed to by the 1st block location pointer field 402, and the 1st hash value location pointer field 406 points to the location of the first hash value stored in the hash table 500, which corresponds to the first block in the run.

Each hash value stored in the hash table 500 may be a cryptographic hash value between 128 bytes and 512 bytes in length, for example. Alternatively, each hash value stored in the hash table 500 may be a computable check sum, which may allow for better performance with nonaligned writes, for example. Each hash value can be employed to represent a block of data in a dramatically-compressed data value. For example, a cryptographic hash value of a 4096-byte block may be represented using only 128 bytes. The use of the hash table 500 to store hash value may enable all change nodes to be a standard fixed length regardless of how many blocks make up the run represented by any given change node 400.

As disclosed in FIG. 6, the change log 600 includes one or more change nodes 400. The change log 600 may be employed to track changes to allocated blocks of the source storage 110 between backups, thus serving as a map at any given time of the changed blocks which need to be included in the next incremental backup of the source storage 110. For example, the change log 600 may be employed to track all changes to the allocated blocks of the source storage 110 between the time t(0) of the base backup disclosed in FIG. 3A and the time t(1) of the incremental backup disclosed in FIG. 3B. The change nodes 400 in the change log 600 may be organized as an unordered list, or may be organized sequentially to match the sequence of changed blocks of the storage being backed up. Thus, the original location of each run of changed blocks in the source storage 110 is expressly stored in the change log 600. The exact number of changed blocks in the source storage 110 in the runs represented by the change log 600 can be calculated by summing the run length fields 404 of all change nodes 400 in the change log 600.

For example, a change log 600 that represents the three changed blocks in the source storage 110 illustrated in FIG. 3B would include two change nodes 400 with the following [1st block location pointer field 402, run length field 404, 1st hash value location pointer field 406] values: [110(5), 2, 500(1)] and [110(9), 1, 500(3)]. In this example, where the first change node 400 has a run length value of "2" and a 1st hash value location pointer value of "500(1)," this signals that the next sequential hash value at location 500(2) in the hash table 500 is the hash value of the second of the two blocks in the run of changed blocks represented by the first change node 400. Using the change log 600 in this example, the changed blocks from the source storage 110 can be backed up in the state at time t(1) in an incremental backup. The change log 600 may then be emptied and reused to track the changed blocks from the source storage 110 between the time t(1) and the time t(2). Subsequently, the incremental backup can be restored by restoring the base and all previous incremental backups from oldest to newest, then restoring the incremental backup.

As discussed in greater detail, calculating and storing the hash values in the change log 600 during the tracking of changes to the source storage 110 can avoid the cost and time of reading the corresponding blocks and calculating the hash values during the analysis phase of creating the incremental backup, resulting in increased efficiency and speed during the creation of each incremental backup.

Figure 7:
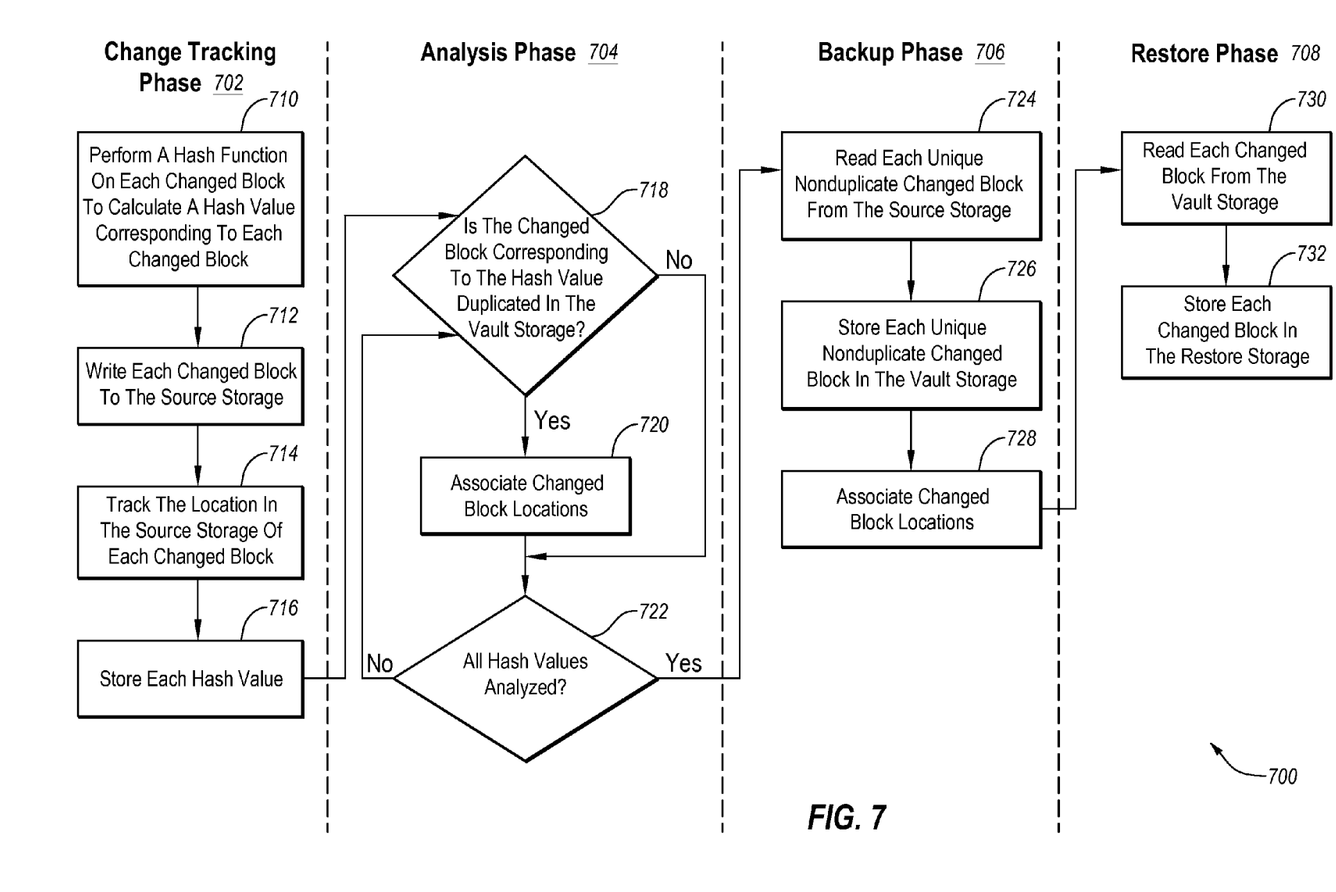
FIG. 7 is a schematic flowchart diagram of an example method of multiphase deduplication including an example change tracking phase.

FIG. 7 is a schematic flowchart diagram of an example method 700 of multiphase deduplication including an example change tracking phase. The method 700 may be implemented, in at least some embodiments, by the snapshot driver 122 of the source system 104 of FIG. 1 and the deduplication module 118 of the deduplication vault system 102 of FIG. 1. For example, the snapshot driver 122 and the deduplication module 118 may be configured to execute computer instructions to perform operations of multiphase deduplication during the creation of an incremental backup of the source storage 110, as represented by one or more phases 702-708 which are made up of the steps 710-732 of the method 700. Although illustrated as discrete phases and steps, various phases/steps may be divided into additional phases/steps, combined into fewer phases/steps, or eliminated, depending on the desired implementation. The method 700 will now be discussed with reference to FIGS. 1, 3B, and 7.

The method 700 includes a distinct change tracking phase 702 that is performed and completed prior to the time that an incremental backup is created, during an analysis phase 704 and a backup phase 706. The performance and completion of the change tracking phase 702 prior to the performance of the analysis phase 704 and the backup phase 706 avoids the cost and time of reading blocks and calculating corresponding hash values during the analysis phase 704, resulting in increased efficiency and speed during the creation of each incremental backup. Further, the performance and completion of the analysis phase 704 prior to the performance of the backup phase 706 may enable decreased fragmentation in the storing of the incremental backup of the source storage 110 in the vault storage 108, resulting in increased efficiency and speed during an optional third restore phase 708 in which the incremental backup of the source storage 110 is restored to a restore storage 112.

The change tracking phase 702 of the method 700 may include performing steps 710-716 for each allocated block in a source storage that changed between the taking of a prior snapshot at a prior point in time and upon which a prior base or incremental backup is based and the taking of a subsequent snapshot at a subsequent point in time and upon which a subsequent incremental backup is based. For example, during the change tracking phase 702, each of the steps 710-716 may be performed for each of the changed blocks 110(5), 110(6), and 110(9) in the source storage 110 of FIG. 3B that changed between the taking of a prior snapshot at time t(0) upon which the prior base backup of FIG. 3A is based and the taking of a subsequent snapshot at time t(1) and upon which the subsequent incremental backup of FIG. 3B is based.

The change tracking phase 702 of the method 700 may begin at steps 710 and 712, in which a hash function is performed on the changed block to calculate a hash value corresponding to the changed block, and the changed block is written to the source storage 110. For example, where the current block is changed block 110(5), at step 710 the snapshot driver 122 may perform a hash function on the changed block 110(5) to calculate a hash value corresponding to the changed block 110(5). The snapshot driver 122 may perform the hash function on the changed block 110(5) while the changed block 110(5) is still in memory on the source system 104 just prior to, simultaneously with, or just subsequent to the step 712 where the changed block 110(5) is written to the source storage 110 by the snapshot driver 122 or by a file system of the source system 104. Performing a hash function on a changed block just prior to, simultaneously with, or just subsequent to writing the changed block to a source storage may be referred to as "hash on write."

At steps 714 and 716 of the change tracking phase 702, the location of the changed block in the source storage is tracked in a change log, and the hash value of the changed block is stored. For example, where the current block is changed block 110(5), at step 710 the snapshot driver 122 may create a change node 400 in the change log 600 for the changed block 110(5) (see FIGS. 4-6). In another example where the current block is changed block 110(6), at step 710 the snapshot driver 122 may update a previously-created change node 400 in the change log 600 that identifies the changed block 110(5) as the first block in a run of changed blocks. In either example, the creation or updating of a change node 400 in the change log 600 will include storing the location of the changed block using the 1st block location pointer field 402 and the run length field 404, as well as storing the hash value using the 1st hash value location pointer field 406 and the hash table 500.

By the conclusion of the change tracking phase 702, the location in the source storage and the corresponding hash value will be stored in the change log 600 for each changed block in the source storage. The calculating and storing of the hash values of the changed blocks in the change log 600 during the tracking of changes to the source storage 110 can avoid the cost and time of reading the corresponding blocks and calculating the hash values during the analysis phase 704, resulting in increased efficiency and speed during the creation of each incremental backup during the analysis phase 704 and backup phase 706.

The analysis phase 704 of the method 700 may include performing steps 718-722 for each unique hash value stored in a change log. For example, during the analysis phase 704, each of the steps 718-722 may be performed for each unique hash value, corresponding to the changed blocks 110(5), 110(6), and 110(9) of FIG. 3B, in the change log 600.

The analysis phase 704 of the method 700 may begin at decision step 718, in which it is determined whether the changed block is duplicated in a vault storage. For example, where the current block is changed block 110(5), at step 718 the deduplication module 118 may compare the hash value corresponding to the changed block 110(5) that is stored in the change log 600 with hash values of the blocks stored in a vault storage 108 to determine if a matching hash value exists. In this example, the hash values of the blocks stored in vault storage 108 may be stored in the database 114. If a matching hash value does exist in the database 114, it is determined that the changed block is duplicated in the vault storage 108 (Yes at step 718). If a matching hash value does not exist in the database 114, it is determined that the changed block is not duplicated in the vault storage 108.

If it is determined at step 718 that the changed block is duplicated in the vault storage 108 (Yes at step 718), then the method 700 proceeds to step 720 of the analysis phase 704 where the location of the changed block in the source storage is associated with the location of the duplicated block in the vault storage 108. Otherwise (No at step 718), the method 700 proceeds to step 722 of the analysis phase 704.

For example, where the current changed block is changed block 110(5), at step 718 it would be determined that the changed block 110(5) is not yet duplicated in the vault storage 108. Where a changed block is determined at step 718 to not be duplicated in the vault storage 108 (No at step 718), this may be noted in the database 114 and the metadata 116. In another example, where the current changed block is changed block 110(9), at step 718 it would be determined that the changed block 110(9) is already duplicated in block 108(6) of the vault storage 108. The deduplication module 118 may then associate, at step 720, the changed block 110(9) from the source storage 110 with the duplicated block 108(6) in the vault storage 108 by noting this association in the metadata 116.

In decision step 722 of the analysis phase 704, it is determined whether all of the unique hash values in the change log have been analyzed. For example, the deduplication module 118 may determine whether all of the unique hash values in the change log 600, corresponding to all of the unique changed blocks in the source storage 110, have been analyzed. If it is determined at step 722 that all unique hash values in the change log 600 have not been analyzed (No at step 722), then the method 700 returns to step 718 where the next unique hash value in the change log 600 is analyzed. Otherwise, if it is determined at step 722 that all unique changed blocks in the change log 600 have been analyzed (Yes at step 722), then the method 700 proceeds to step 724 of the backup phase 706.

By the conclusion of the analysis phase 704, it will have been determined which changed blocks from the source storage have already been duplicated in the vault storage and which changed blocks have not yet been stored in the vault storage. This determination may enable runs of nonduplicate changed blocks from the source storage to be strategically stored in the backup of the vault storage with little or no fragmentation of the runs. This maintenance of runs in a backup may be particularly useful during the subsequent restore phase 708 because it reduces the time spent seeking the blocks that make up the incremental backup of the source storage, as discussed in greater detail below.

At step 724 of the backup phase 706, each unique nonduplicate changed block is read from the source storage and at step 726 of the backup phase 706, each unique nonduplicate changed block is stored in the vault storage. For example, the deduplication module 118 may read each unique nonduplicate changed block from the source storage 110 and then store each unique nonduplicate changed block in the vault storage 108. In one example, the run 110(5)-110(6) of the source storage 110 may be read and stored together in the run 108(10)-108(11) of the vault storage 108. Upon each block being stored in the vault storage 108, the hash of the block and the location of the block in the vault storage 108 may be noted in the database 114. The hash value calculated at step 710 may be reutilized so that the hash value of each block is only calculated once.

At step 728 of the backup phase 706, the location of each unique nonduplicate changed block in the source storage is associated with the location of the corresponding block in the vault storage. For example, the deduplication module 118 may associate the run 110(5)-110(6) of the source storage 110 with the corresponding run 108(10)-108(11) of the vault storage 108 in the metadata 116.

By the conclusion of the backup phase 706, an incremental backup of the source storage will have been stored in the vault storage. Unlike a standard incremental backup image, however, the incremental backup of the source storage as stored in the vault storage will likely have been reduced in size due to the elimination of duplicate blocks within the incremental backup. In addition, where multiple storages are backed up into the vault storage, the total overall size of the backups will likely be reduced in size due to the elimination of duplicate blocks across the backups.

At some point in time after the creation of the incremental backup of the source storage 110, the optional restore phase 708 of the method 700 may be performed in order to restore the incremental backup onto a storage, such as the restore storage 112. It is noted that prior to the performance of the restore phase 708 for the incremental backup, the base backup and all previous incremental backups will need to have been restored onto the restore storage 112 from oldest to newest.

At step 730 of the restore phase 708, each changed block that was stored in the source storage at the subsequent point in time is read from the vault storage and, at step 732, each changed block that was stored in the source storage at the subsequent point in time is stored in the restore storage. For example, the deduplication module 118 may read each changed block that was stored in the source storage 110 at time t(1) from the vault storage 108 and store the blocks in the restore storage 112 in the same position as stored in the source storage 110 at time t(1). For example, at the completion of step 732, the blocks of the restore storage 112 should be identical to the blocks of the source storage 110 disclosed in FIG. 3B.

During the step 730 of the restore phase 708, the previous maintenance of runs in the incremental backup, which was made possible by the completion of the analysis phase 704 prior to the backup phase 706, may reduce the number of seek operations because reading each run only requires a single seek operation. Reducing the number of seek operations reduces the total time spent seeking the blocks during the reading of the blocks at step 730, thus resulting in increased efficiency and speed during the restore phase 708.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A non-transitory computer-readable medium storing a program that causes a processor to execute a method of multiphase deduplication, the method comprising:
   a change tracking phase that includes performing the following steps for each allocated block in a source storage that is changed between the taking of a prior snapshot at a prior point in time and upon which a prior base or incremental backup is based and the taking of a subsequent snapshot at a subsequent point in time and upon which a subsequent incremental backup is based, without performing the following steps on any allocated block in the source storage that is not changed between the prior point in time and the subsequent point in time:
    temporarily storing a copy of the changed block in a volatile memory of the source system prior to writing the changed block to the source storage;
    performing a hash function only once on the copy of the changed block, while the copy is temporarily stored in a volatile memory of the source system, to calculate a hash value corresponding to the changed block;
    writing the changed block to the source storage; and
    tracking, in a change log, a location in the source storage of the changed block and the corresponding cryptographic hash value;
an analysis phase that is performed after completion of the change tracking phase and that includes performing the following steps for each unique hash value stored in the change log:
    comparing the hash value with hash values of blocks that are stored in a vault storage, without reading the corresponding unique changed block from the source storage, to determine if the corresponding unique changed block in the source storage is duplicated in the vault storage; and
    associating a location of the corresponding unique changed block in the source storage with a location of the corresponding duplicated block stored in the vault storage if the corresponding unique changed block is duplicated in the vault storage; and
a backup phase that includes performing, after completion of the analysis phase, the following steps for all unique nonduplicate runs of changed blocks stored in the source storage, where each unique nonduplicate run of changed blocks includes two or more nonduplicate changed blocks that are stored sequentially in the source storage:
    reading the runs from the source storage;
    storing the runs in the vault storage in the same sequence as stored in the source storage at the subsequent point in time; and
    associating a location of each run stored in the source storage with a corresponding location of the run stored in the vault storage.

2. The non-transitory computer-readable medium as recited in claim 1, wherein:
    the hash function comprises a cryptographic hash function and the hash value comprises a cryptographic hash value; or
    the hash function comprises a computable check sum function and the hash value comprises a computable check sum value.

3. The non-transitory computer-readable medium as recited in claim 1, wherein the change log comprises an unordered list of data structures each corresponding to a run of changed blocks.

4. The non-transitory computer-readable medium as recited in claim 1, wherein the method further comprises a restore phase that is performed after completion of the backup phase and that includes reading, from the vault storage, and storing, in a restore storage, each changed block that was stored in the source storage at the subsequent point in time in the same position as stored in the source storage at the subsequent point in time.

5. The non-transitory computer-readable medium as recited in claim 1, wherein the method further comprises a restore phase that is performed after completion of the backup phase and that includes performing, after completion of the backup phase, the following steps for each changed block that was stored in the source storage at the subsequent point in time:
    reading the block from the vault storage; and
    storing the block in a restore storage in the same position as stored in the source storage at the subsequent point in time.

6. The non-transitory computer-readable medium as recited in claim 1, wherein the method further comprises a restore phase that is performed after completion of the backup phase and that includes performing, after completion of the backup phase, the following steps for all runs of changed blocks stored in the source storage at the subsequent point in time:
    reading the runs from the vault storage; and
    storing the runs in a restore storage in the same position as stored in the source storage at the subsequent point in time.

7. The non-transitory computer-readable medium as recited in claim 1, wherein the step of performing the hash function only once on the copy of the changed block includes performing the hash function only once on the copy of the changed block just prior to, simultaneously with, or just subsequent to writing the changed block to the source storage.

8. The non-transitory computer-readable medium as recited in claim 1, wherein the vault storage is configured to only store, during the backup phase, a single copy of each unique changed block from the source storage to prevent having any duplicate blocks in the vault storage.

\* \* \* \* \*